(12) United States Patent
He et al.

(10) Patent No.: US 11,613,351 B2
(45) Date of Patent: Mar. 28, 2023

(54) BUTTERFLY-INSPIRED FLAPPING-WING AERIAL ROBOT AND PULL CORD TYPE TURNING MECHANISM THEREOF

(71) Applicant: University of Science and Technology Beijing, Beijing (CN)

(72) Inventors: Wei He, Beijing (CN); Haifeng Huang, Beijing (CN); Jiubin Wang, Beijing (CN); Xinyue Tang, Beijing (CN); Xiuyu He, Beijing (CN); Qiang Fu, Beijing (CN); Yao Zou, Beijing (CN); Hui Zhang, Beijing (CN); Changyin Sun, Beijing (CN); Yaonan Wang, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 0 days.

(21) Appl. No.: 17/743,486

(22) Filed: May 13, 2022

(65) Prior Publication Data
US 2023/0008645 A1    Jan. 12, 2023

(30) Foreign Application Priority Data
Jul. 8, 2021   (CN) .......................... 202110770174.6

(51) Int. Cl.
*B64C 33/02* (2006.01)
*B64U 10/40* (2023.01)
(Continued)

(52) U.S. Cl.
CPC .............. *B64C 33/02* (2013.01); *B64U 10/40* (2023.01); *B64U 50/19* (2023.01); *B64U 2201/20* (2023.01); *F16H 19/005* (2013.01)

(58) Field of Classification Search
CPC .............. B64C 33/02; B64C 2201/025; B64C 2201/042; B64C 2201/146; F16H 19/005;
(Continued)

(56) References Cited

U.S. PATENT DOCUMENTS

| | | | | |
|---|---|---|---|---|
| 11,077,941 | B2 * | 8/2021 | Nakamura | .............. B64C 33/02 |
| 2004/0195436 | A1 * | 10/2004 | Sinclair | .................. A63H 31/08 244/49 |

(Continued)

FOREIGN PATENT DOCUMENTS

| | | |
|---|---|---|
| CN | 201816736 U | 5/2011 |
| CN | 102219053 A | 10/2011 |

(Continued)

*Primary Examiner* — Medhat Badawi
*Assistant Examiner* — Vicente Rodriguez
(74) *Attorney, Agent, or Firm* — Bayramoglu Law Offices LLC (57) ABSTRACT

A pull cord type turning mechanism for a butterfly-inspired flapping-wing aerial robot includes a motor, a cord reel, a cord reel gear, a potentiometer gear, a potentiometer, a control module, and a power supply. The control module is connected to the motor and the potentiometer. A rotary shaft of the motor is connected to the cord reel, the cord reel is coaxially connected to the cord reel gear, the cord reel gear is meshed with the potentiometer gear, and the potentiometer gear is connected to a rotary shaft of the potentiometer. The cord reel gear is provided with two cord grooves and two pull cords. One ends of the two pull cords are fixed in the two cord grooves, respectively, and the other ends thereof are fixed at the tips of front wings of two sides of the butterfly-inspired flapping-wing aerial robot, respectively.

18 Claims, 3 Drawing Sheets

(51) Int. Cl.
*B64U 50/19* (2023.01)
*F16H 19/00* (2006.01)

(58) Field of Classification Search
CPC ...... A63H 27/008; B64U 10/40; B64U 50/19; B64U 2201/20
See application file for complete search history.

(56) References Cited

U.S. PATENT DOCUMENTS

| | | | | |
|---|---|---|---|---|
| 2007/0210207 A1* | 9/2007 | Liao | ........................ | B64C 33/02 |
| | | | | 244/22 |
| 2015/0307191 A1* | 10/2015 | Samuel | ................... | B64C 33/02 |
| | | | | 244/22 |
| 2019/0263517 A1* | 8/2019 | Nakamura | .............. | B64C 33/02 |
| 2020/0324892 A1* | 10/2020 | Benedict | ................... | B64C 3/26 |

FOREIGN PATENT DOCUMENTS

| | | | |
|---|---|---|---|
| CN | 102874409 | A | 1/2013 |
| CN | 105644784 | A | 6/2016 |
| CN | 108275269 | A | 7/2018 |
| CN | 108820207 | A | 11/2018 |
| CN | 108945430 | A | 12/2018 |
| CN | 110371288 | A | 10/2019 |
| CN | 110550205 | A | 12/2019 |
| CN | 112429223 | A | 3/2021 |
| CN | 112977818 | A | 6/2021 |

* cited by examiner

BUTTERFLY-INSPIRED FLAPPING-WING AERIAL ROBOT AND PULL CORD TYPE TURNING MECHANISM THEREOF

CROSS REFERENCE TO THE RELATED APPLICATIONS

This application is based upon and claims priority to Chinese Patent Application No. 202110770174.6, filed on Jul. 8, 2021, the entire contents of which are incorporated herein by reference.

TECHNICAL FIELD

The present invention relates to the field of flapping-wing aerial robot technology, and in particular, to a butterfly-inspired flapping-wing aerial robot and a pull cord type turning mechanism thereof.

BACKGROUND

The flapping-wing aerial robot is a novel aerial robot that mimics the flight of birds or insects. Compared with fixed-wing and rotor aerial robots, the flapping-wing aerial robot has higher efficiency and better flexibility, and is stealthier and less noisy due to its bionic characteristic, so it can be widely used. A butterfly-inspired flapping-wing aerial robot refers to a flapping-wing aerial robot that mimics the shape and flight mode of a butterfly, and consists of a driving mechanism and a turning mechanism. The driving mechanism of existing butterfly-inspired flapping-wing aerial robots is mostly driven by a motor, and two wings flap synchronously to generate lift and thrust. The turning is usually realized by the leftward and rightward swing of a tail mounted at the tail of the aerial robot. This turning manner increases the weight and reduces the performance of the aerial robot. Moreover, due to the low flight speed of the butterfly-inspired flapping-wing aerial robot, the turning manner by tuning aerodynamics through the tail has poor effect and leads to a large turning radius. In addition, using an artificial tail for turning sacrifices the bionic characteristic of the butterfly-inspired flapping-wing aerial robot.

SUMMARY

The present invention provides a butterfly-inspired flapping-wing aerial robot and a pull cord type turning mechanism thereof, which have the advantages of simple structure, light weight, easiness in control, good control effect, and high bionic characteristic in comparison with a prior art.

In order to solve the aforementioned problems, the present invention provides the following technical solution:

The present invention relates to a pull cord type turning mechanism for a butterfly-inspired flapping-wing aerial robot, which is mounted on a main carbon rod of a fuselage of the butterfly-inspired flapping-wing aerial robot. The pull cord type turning mechanism includes a motor, a cord reel, a cord reel gear, a potentiometer gear, a potentiometer, a control module, and a power supply.

The control module is connected to the motor and the potentiometer. A rotary shaft of the motor is fastened to the cord reel, which is coaxially connected to the cord reel gear. The cord reel gear is meshed with the potentiometer gear which is connected to a rotary shaft of the potentiometer. The cord reel gear is provided with two cord grooves and two pull cords. One end of one pull cord is fixed in one cord groove, and the other end is fixed at the tip of a front wing of one side of the butterfly-inspired flapping-wing aerial robot. One end of the other pull cord is fixed in another cord groove, and the other end is fixed at the tip of a front wing of the other side of the butterfly-inspired flapping-wing aerial robot. The two pull cords are wound in opposite directions in the two cord grooves.

The control module is configured for: receiving a turning instruction sent by a remote controller of the butterfly-inspired flapping-wing aerial robot, determining a rotation direction and a target angle of the cord reel according to the turning instruction, and controlling the motor to start rotating according to the rotation direction; and acquiring a potential value of the potentiometer in real time from the potentiometer, determining a rotation angle of the cord reel according to the potential value, and controlling the motor to stop when the rotation angle of the cord reel reaches the target angle.

A butterfly-inspired flapping-wing aerial robot includes a fuselage, a driving mechanism mounted on the main carbon rod of the fuselage, and a turning mechanism mounted on the main carbon rod of the fuselage. The turning mechanism is the aforementioned pull cord type turning mechanism. The fuselage includes a main carbon rod and wings mounted on the left and right sides of the main carbon rod. The driving mechanism is configured for driving the wings on the left and right sides to flap in the same frequency and amplitude. The pull cord type turning mechanism is configured for changing the effective area of the wing on one side to perform turning under the control of the remote controller.

Compared with the prior art, the technical solution of the present invention at least has the following technical effects:

In the aforementioned solution, the motor drives the cord reel to rotate, the rotation of the cord reel pulls two pull cords, the two pull cords pull the wings on the left and right sides to deform, leading to a difference between the effective areas of the left and right wings, and when the wings on the left and right sides flap in the same frequency and amplitude, different lifts are generated, so that the butterfly-inspired flapping-wing aerial robot is inclined to one side to perform turning. At the same time, the cord reel drives the cord reel gear to rotate synchronously, the cord reel gear drives the potentiometer gear to rotate, and the potentiometer gear drives the rotary shaft of the potentiometer to rotate synchronously, so that a potential value output by the potentiometer changes. Based on this, the control module captures the potential value of the potentiometer, so as to obtain a rotation angle of the rotary shaft of the potentiometer, a rotation angle of the potentiometer gear, a rotation angle of the cord reel gear, and a rotation angle of the cord reel in sequence, and then judges by the rotation angle of the cord reel whether a target rotation angle indicated by a control instruction is reached or not, so as to determine whether the motor needs to be stopped or not, thus realizing the closed-loop feedback control of the rotation angle of the cord reel. The larger the rotation angle of the cord reel, the smaller the turning radius of the flapping-wing aerial robot. According to a corresponding relationship between the rotation angle of the cord reel and the turning radius of the flapping-wing aerial robot, the accurate control of the turning radius of the butterfly-inspired flapping-wing aerial robot is further realized. The larger the rotation angle of the cord reel, the larger the area difference between the wings on the left and right sides, and the smaller the turning radius. The turning mechanism according to the present invention is simple in structure, light in weight, easy to control, good in control effect, and suitable for weight-sensitive, and can solve the problem caused by the turning difficulty. Compared with other turning modes, the turning mechanism according to the present invention can more easily carry out large-angle turning by changing the areas of the wings on the left and right sides, achieving a minimum turning radius of only 0.8 meters, and is characterized by flexibility and easiness in control. The turning mechanism mounted on the main carbon rod of the fuselage is small in volume and of high bionic characteristic.

BRIEF DESCRIPTION OF THE DRAWINGS

In order to more clearly illustrate the technical solutions in the embodiments of the present invention, the accompanying drawings which are required to be used in the description of the embodiments will be introduced briefly below. Apparently, the accompanying drawings described below are merely some embodiments of the present invention, and those of ordinary skill in the art can also obtain other accompanying drawings according to these accompanying drawings without making creative efforts.

Reference numerals: 1. Left front wing of butterfly-inspired flapping-wing aerial robot; 2. Left rear wing of butterfly-inspired flapping-wing aerial robot; 3. Driving mechanism of butterfly-inspired flapping-wing aerial robot; 4. Turning mechanism of butterfly-inspired flapping-wing aerial robot; 5. Right rear wing of butterfly-inspired flapping-wing aerial robot; 6. Right front wing of butterfly-inspired flapping-wing aerial robot; 401. Pull cord; 402. Another pull cord; 403. Support frame; 404. Potentiometer; 405. Potentiometer gear; 406. Fixed shaft; 407. Cord reel gear; 408. Cord reel; 409. Motor; 403a. Support frame fixing hole; 403b. Pull cord hole; 403c. Another pull cord hole; 403d. Potentiometer fixing hole; 403e. Cord reel gear fixing hole; 403f. Motor fixing hole; 408a. Cord groove; 408b. Another cord groove; 408c. Pull cord fixing hole; 408d. Another pull cord fixing hole; 410. Control module.

DETAILED DESCRIPTION OF THE EMBODIMENTS

In order to make the objective, technical solutions and advantages of the present invention clearer, implementation of the present invention will be further described in detail below with reference to the accompanying drawings.

The present invention provides a pull cord type turning mechanism for a butterfly-inspired flapping-wing aerial robot. As shown in FIGS. 1 to 6, the pull cord type turning mechanism is mounted on a main carbon rod of a fuselage of the butterfly-inspired flapping-wing aerial robot. The pull cord type turning mechanism includes a motor 409, a cord reel 408, a cord reel gear 407, a potentiometer gear 405, a potentiometer 404, a control module 410, and a power supply.

Figure 1:
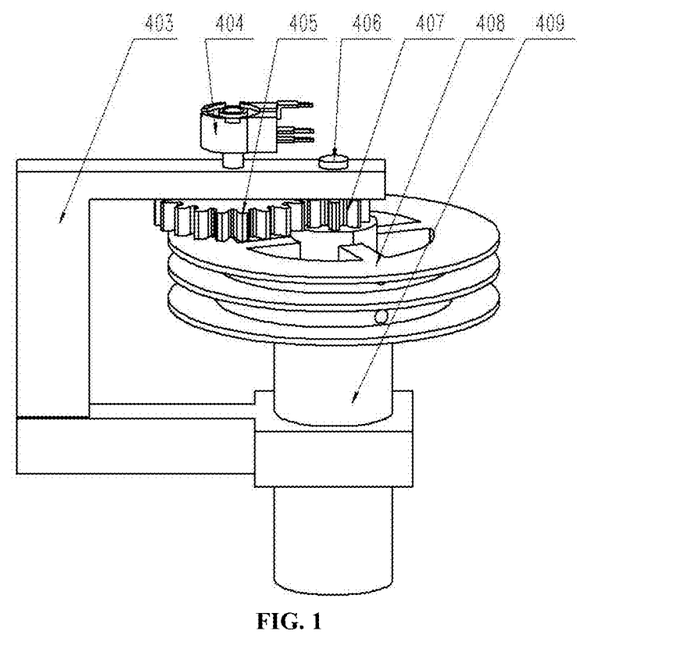
FIG. 1 is a schematic structural diagram of a pull cord type turning mechanism for a butterfly-inspired flapping-wing aerial robot according to an embodiment of the present invention.
Figure 3:
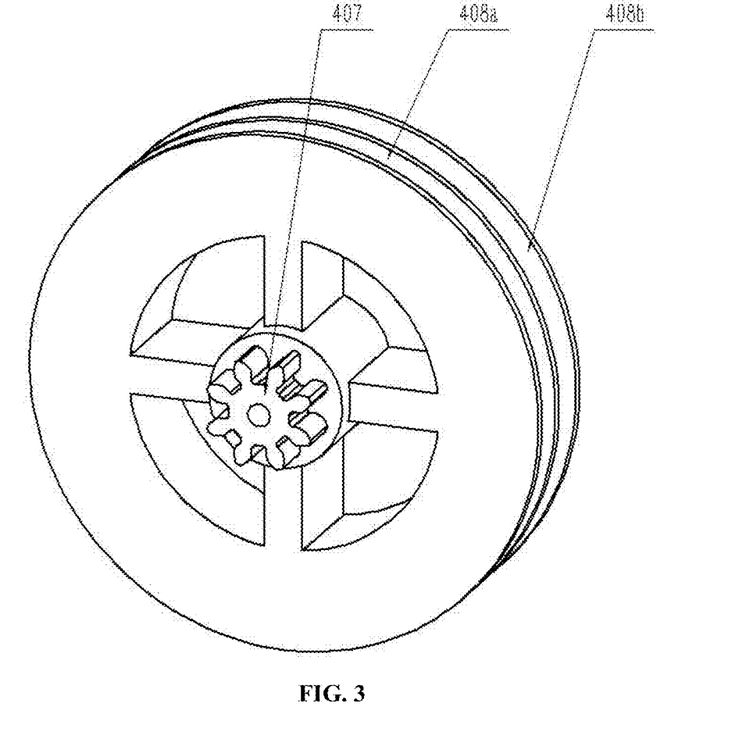
FIG. 3 is a schematic structural diagram of a cord reel and a cord reel gear in FIG. 1.

The control module 410 is connected to the motor 409 and the potentiometer 404. A rotary shaft of the motor 409 is fastened to the cord reel 408, the cord reel 408 is coaxially connected to the cord reel gear 407, the cord reel gear 407 is meshed with the potentiometer gear 405, and the potentiometer gear 405 is connected to a rotary shaft of the potentiometer 404. The cord reel gear 407 is provided with two cord grooves and two pull cords 401, 402. One end of one pull cord 401 is fixed in one cord groove 408a, and the other end is fixed at the tip of a left front wing 1 of the butterfly-inspired flapping-wing aerial robot. One end of the other pull cord 403c is fixed in another cord groove 408b, and the other end is fixed at the tip of a right front wing 6 of the butterfly-inspired flapping-wing aerial robot. The two pull cords 401, 402 are wound in opposite directions in the two cord grooves 408a, 408b.

The control module 410 is configured for: receiving a turning instruction sent by a remote controller of the butterfly-inspired flapping-wing aerial robot, determining a rotation direction and a target angle of the cord reel 408 according to the turning instruction, and controlling the motor 409 to start rotating according to the rotation direction; and acquiring a potential value of the potentiometer 404 in real time from the potentiometer 404, determining a rotation angle of the cord reel 408 according to the potential value, and controlling the motor 409 to stop when the rotation angle of the cord reel 408 reaches the target angle.

Since the turning mechanism is mounted on the main carbon rod of the fuselage instead of the tail, the bionic characteristic of the butterfly-inspired flapping-wing aerial robot is enhanced.

It can be understood that when the left wing and right wing of the butterfly-inspired flapping-wing aerial robot flap in the same frequency and amplitude under the drive of its driving mechanism, the motor of the turning mechanism is in a shutdown state, the cord reel does not rotate, the winding lengths of the two pull cords in the corresponding cord grooves are the same, both the cord reel gear and the potentiometer gear do not rotate as well, the rotary shaft of the potentiometer is also at a median position, and the voltage output by the potentiometer is 1.65 V. Thus, at this point, the left wing and right wing keep the same state, and the effective areas of the wings on both sides are the same.

It can be understood that since the rotary shaft of the motor is fastened to the cord reel, after the motor is started, the rotary shaft of the motor will drive the cord reel to rotate, and when the cord reel rotates, the winding lengths of the two pull cords in the cord grooves will change. For example, when the rotary shaft of the motor rotates leftward, the cord reel will also rotate to left, so that the winding length of the pull cord wound to the left on the cord reel will become shorter and the length of the pull cord from the cord groove to the tip of the corresponding front wing will become longer, making the corresponding wing unfold and the effective area larger. The winding length of the other pull cord wound to the right in the cord groove will become longer and the length of the pull cord from the cord groove to the tip of the corresponding front wing will become shorter, pulling the corresponding wing to fold and making the effective area smaller. When the two wings flap in the same frequency and amplitude and the effective areas are different, their generated lifts are different, which makes the fuselage and the wings inclined to left or right, thus realizing turning.

Thus, the rotation of the rotary shaft of the motor drives the cord reel to rotate, making the winding lengths of the pull cords change and then the effective areas of the wings on both sides different, and ultimately the turning is realized.

Because of the number of turns of the rotary shaft of the motor, a rotation angle of the cord reel is determined, a difference between the effective areas of the two wings is then determined, and ultimately a turning radius is determined. In fact, the more turns the motor rotates, the larger the rotation angle of the cord reel, the larger the difference between the effective areas of the two wings, and the smaller the turning radius, that is, the larger agile the butterfly-inspired flapping-wing aerial robot turns.

The turning mechanism of the present invention also includes a gear set, a potentiometer, etc. Since the cord reel gear is coaxially connected to the cord reel, when the cord reel rotates, the cord reel gear also rotates coaxially. Since the cord reel gear and the potentiometer gear are meshed, the potentiometer gear will also rotate when the cord reel gear rotates. Since the potentiometer gear is connected to the rotary shaft of the potentiometer, when rotating, the potentiometer gear will drive the rotary shaft of the potentiometer to rotate together. When the rotary shaft of the potentiometer rotates, the potentiometer will output a corresponding voltage value, which can be called a potential value. According to the potential value, a rotation angle of the rotary shaft of the potentiometer, a rotation angle of the potentiometer gear, a rotation angle of the cord reel gear, a difference between the effective areas of the left and right wings and a turning radius can be obtained in sequence. Thus, the potential value of the potentiometer can reflect the turning radius. The potential value of the potentiometer ranges from 0 V to 3.3 V. When the potential value is 1.65 V, the flapping-wing aerial robot flies in a straight line. After the potential value deviates from 1.65 V, the flapping-wing aerial robot makes a turn. When the potential value approaches 0 V or 3.3 V, the turning radius decreases, and the flapping-wing aerial robot turns more sharply.

In order to accurately control the turning radius, the turning mechanism according to the present invention is also provided with a control module 410, which can receive a turning instruction sent by the remote controller of the butterfly-inspired flapping-wing aerial robot. When receiving the control instruction, the control module 410 can analyze the control instruction to determine a rotation direction and a target angle of the cord reel. The larger the rotation angle of the cord reel, the smaller the turning radius of the butterfly-inspired flapping-wing aerial robot. When the rotation angle of the cord reel reaches its target, the turning radius of the butterfly-inspired flapping-wing aerial robot will reach its target turning radius. At this point, when the motor stops, the butterfly-inspired flapping-wing aerial robot will turn to this turning radius.

In practice, a user can constantly adjust the rotation angle of the cord reel by means of a joystick of the remote controller, and the remote controller will continuously send turning instructions to the control module 410, so that the angle of the cord reel constantly changes, and thus the turning radius of the butterfly-inspired flapping-wing aerial robot constantly changes.

It can be understood that the motor drives the cord reel to rotate, the rotation of the cord reel pulls two pull cords, the two pull cords pull the wings on the left and right sides to deform, leading to a difference in the effective areas of the left and right wings, and when the wings on the left and right sides flap in the same frequency and amplitude, different lifts are generated, so that the butterfly-inspired flapping-wing aerial robot is inclined to one side to perform turning. At the same time, the cord reel drives the cord reel gear to rotate synchronously, the cord reel gear drives the potentiometer gear to rotate, and the potentiometer gear drives the rotary shaft of the potentiometer to rotate synchronously, so that a potential value output by the potentiometer changes. Based on this, the control module 410 captures the potential value of the potentiometer, so as to obtain a rotation angle of the rotary shaft of the potentiometer, a rotation angle of the potentiometer gear, a rotation angle of the cord reel gear, and a rotation angle of the cord reel in sequence, and then judges by the rotation angle of the cord reel whether a target rotation angle indicated by a control instruction is reached or not, so as to determine whether the motor needs to be stopped or not, thus realizing the closed-loop feedback control of the rotation angle of the cord reel. According to the corresponding relationship between the rotation angle of the cord reel and the turning radius of the flapping-wing aerial robot, the turning radius of the butterfly-inspired flapping-wing aerial robot is further accurately controlled. The larger the rotation angle of the cord reel, the larger the area difference between the left and right wings, and the larger the turning radius. The turning mechanism according to the present invention is simple in structure, light in weight (the turning mechanism according to the present invention is weighed only 10 g), easy to control, good in control effect and suitable for weight-sensitive, slow flapping-wing aerial robots, and can solve the problem caused by the turning difficulty. Compared with other turning modes, the turning mechanism according to the present invention can more easily carry out large-angle turning by changing the areas of the left and right wings, achieving a minimum turning radius of only 0.8 meters, and is characterized by flexibility and easiness in control.

Further, compared with other pull cord type turning modes, the present invention adopts the cord reel to change the lengths of the left and right pull cords, captures the rotation angle of the cord reel by means of the potentiometer and the gear set, and controls the rotation angle of the cord reel in a closed loop to ensure the control accuracy. Compared with the actuator drive, the motor drive enables the cord reel to rotate for multiple turns, and allows for longer pulling distance, greater wing deformation, and more agile turning.

Figure 2:
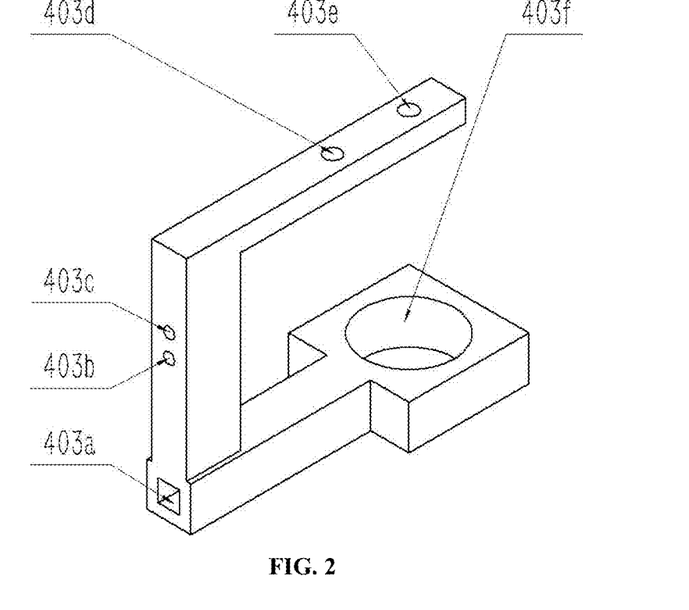
FIG. 2 is a schematic structural diagram of a support frame in FIG. 1.

In practical implementation, the turning mechanism according to the present invention may further include a support frame 403; the support frame 403 is provided with a support frame fixing hole 403a, a motor fixing hole 403f, and a potentiometer fixing hole 403d; the motor fixing hole 403f is configured for fixing the motor on the support frame 403; the potentiometer fixing hole 403d is configured for fixing the potentiometer on the support frame 403; and the support frame fixing hole 403a is configured for fixing the support frame 403 on the main carbon rod of the fuselage.

That is, the motor is fixed on the support frame through the motor fixing hole 403f, the potentiometer is fixed on the support frame through the potentiometer fixing hole 403d, and the support frame is then fixed on the main carbon rod of the fuselage through the support frame fixing hole 403a. In this way, the main components can be fixed on the main carbon rod of the fuselage.

Of course, the support frame may also be provided with a cord reel gear fixing hole 403e, which is connected to one end of a fixed shaft 406, and the other end of the fixed shaft 406 is inserted into the central hole of the cord reel gear.

That is, in addition to the arrangement of the cord reel gear fixing hole 403e in the support frame, the fixed shaft 406 is also needed; one end of the fixed shaft 406 is connected to the support frame through the cord reel gear fixing hole 403*e* and the other end of the fixed shaft 406 is inserted into the central hole of the cord reel gear, which not only does not affect the normal rotation of the cord reel gear, but also plays a role in fixing the rotation axes of the cord reel and the cord reel gear and reducing shaking.

For example, the diameter of the central hole of the cord reel gear is 1.5 mm, and the fixed shaft is 4 mm in length and 1.5 mm in diameter, with one end being fixed in the cord reel gear fixing hole 403*e* and the other end being inserted into the central hole of the cord reel gear.

Of course, the support frame may also be provided with two pull cord holes for threading two pull cords. The pull cord 401 wound in one cord groove 408*a* passes through a pull cord hole 403*c* in the support frame and is connected to the tip of the front wing on one side, while the pull cord 402 wound in the other cord groove 408*b* passes through another pull cord hole 403*b* in the support frame and is connected to the tip of the front wing on the other side.

That is, a pull cord is inserted into a pull cord hole with one end being fixed in the corresponding cord groove, and the pull cord is then wound from the corresponding cord groove and passes through the pull cord hole, so that the other end of the pull cord is fixed at the tip of the front wing on one side, thus realizing the guidance of the pull cord.

Figure 4:
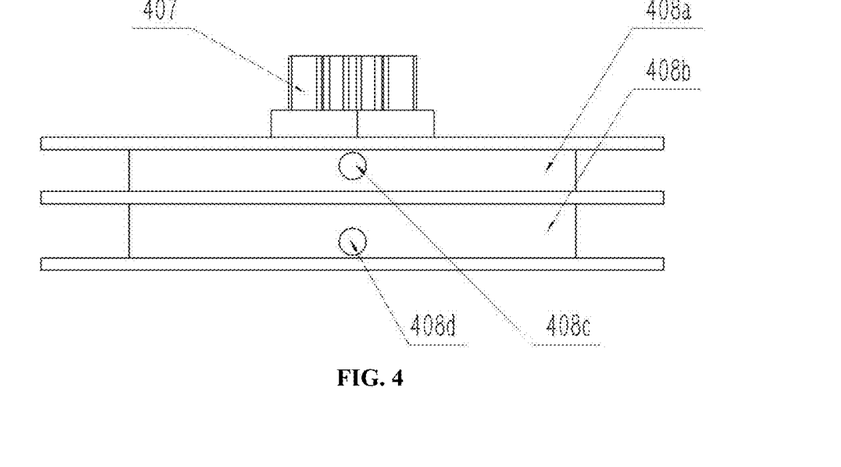
FIG. 4 is a side view of FIG. 3.

In order to fix one end of the pull cord, each of the cord grooves may be provided with a pull cord fixing hole, which is configured for fixing one end of the corresponding pull cord. For example, the cord groove 408*a* is provided with a pull cord fixing hole 408*c*, and the cord groove 408*b* is provided with a pull cord fixing hole 408*d*.

That is, one end of the pull cord is fixed in the pull cord fixing hole, the other end is fixed on the tip of the front wing on one side, and the middle part passes through the pull cord hole.

In practical implementation, the cord reel gear and the potentiometer gear may be with the same modulus, and the number of teeth of the cord reel gear may be half of that of the potentiometer gear.

For example, the cord reel gear is a standard gear with a modulus of 1 and 10 teeth and with the tooth width being 3 mm; and the potentiometer gear is a standard gear with a modulus of 1 and 20 teeth and with the tooth width being 3 mm. At this point, the cord reel gear drives the potentiometer gear and the rotary shaft of the potentiometer to rotate half a circle each time when rotating for a circle.

For another example, the cord reel gear is with a modulus of 0.5 and 10 teeth, and the potentiometer gear is with a modulus of 0.5 and 20 teeth. At this point, the cord reel gear drives the potentiometer gear and the rotary shaft of the potentiometer to rotate half a circle each time when rotating for a circle.

Further, the effective rotation angle of the rotary shaft of the potentiometer may be 0° to 300°, the corresponding rotation angle of the cord reel is 0° to 600°, and each pull cord is wound in the corresponding cord groove for two turns.

Since the cord reel gear drives the rotary shaft of the potentiometer to rotate half a circle each time when rotating for a circle, when the effective rotation angle of the rotary shaft of the potentiometer is 0° to 300°, the corresponding rotation angle of the cord reel is 0° to 600°.

Of course, the effective rotation angle of the rotary shaft of the potentiometer may also be described as −150° to 150°. At this point, the corresponding rotation angle of the cord reel is −300° to 300°.

The motor may be a coreless motor, which has the characteristics of small size, light weight and convenience in mounting, and is very suitable for the turning mechanism of the present invention.

In practical implementation, the turning mechanism according to the present invention may also include a power supply, which is connected to the control module 410, the motor, and the potentiometer; and the control module 410 and the power supply are fixed on the main carbon rod of the fuselage.

That is, the control module 410, the motor and the potentiometer are powered by the power supply, and moreover, the control module 410 and the power supply are mounted on the main carbon rod of the fuselage, so that all components of the turning mechanism are put together.

The cord reel and the cord reel gear may be coaxially fixed by adhesive.

It can be understood that the cord reel is provided with two cord grooves, and is actually of a spoke structure. A cord reel fixing hole with a diameter of 1.5 mm may be mounted at the center of the cord reel, and the cord reel is fixed on the rotary shaft of the motor, i.e. the output shaft, through the cord reel fixing hole, and rotates synchronously with the rotary shaft of the motor.

The cord reel and the cord reel gear are fixed by adhesive to keep synchronous rotation.

The two pull cords may be of an equal length, and are wound on the corresponding cord reel, respectively, in opposite directions, e.g., in left and right directions or clockwise and counterclockwise directions. The other end of one pull cord is fixed on the tip of the left front wing, and the other end of the other pull cord is fixed on the tip of the right front wing. Through the rotation of the cord reel, the lengths of the two pull cords extending out of the cord reel can be changed to drive the left wing and the right wing to fold or unfold, thus changing the effective areas of the left and right wings. When the left and right wings flap in the same frequency and amplitude, the left and right wings with different areas generate different lifts and thrusts, so that the fuselage of the butterfly-inspired flapping-wing aerial robot is inclined to turn.

It can be understood that the function of the controller is to receive and parse a turning instruction sent by the remote controller and generate a motor control signal to drive the motor to rotate in a preset direction. Moreover, a potential value is obtained from the potentiometer, according to which a rotation angle of the cord reel is calculated, and the motor then performs feedback or closed-loop control for the cord reel, so as to accurately control turning. In order to implement the above function, the controller is equipped with a main control microchip, a wireless serial port module, a motor control module, etc., and is connected to the remote controller through the wireless serial port module.

In a second aspect, the present invention provides a butterfly-inspired flapping-wing aerial robot, which includes a fuselage, a driving mechanism mounted on a main carbon rod of the fuselage, and a turning mechanism mounted on the main carbon rod of the fuselage. The turning mechanism is the pull cord type provided by the first aspect. The fuselage includes a main carbon rod and wings mounted on the left and right sides of the main carbon rod. The driving mechanism is configured for driving the wings on the left and right sides to flap in the same frequency and amplitude. The pull cord type turning mechanism is configured for changing the effective area of the wing on one side to perform turning under the control of the remote controller.

Figure 5:
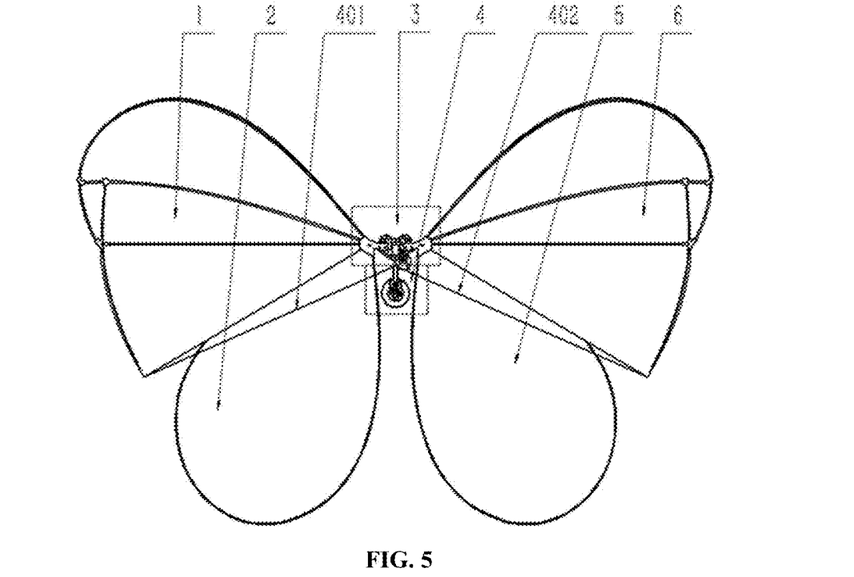
FIG. 5 is a schematic diagram of a butterfly-inspired flapping-wing aerial robot flying in a straight line in an embodiment of the present invention.
Figure 6:
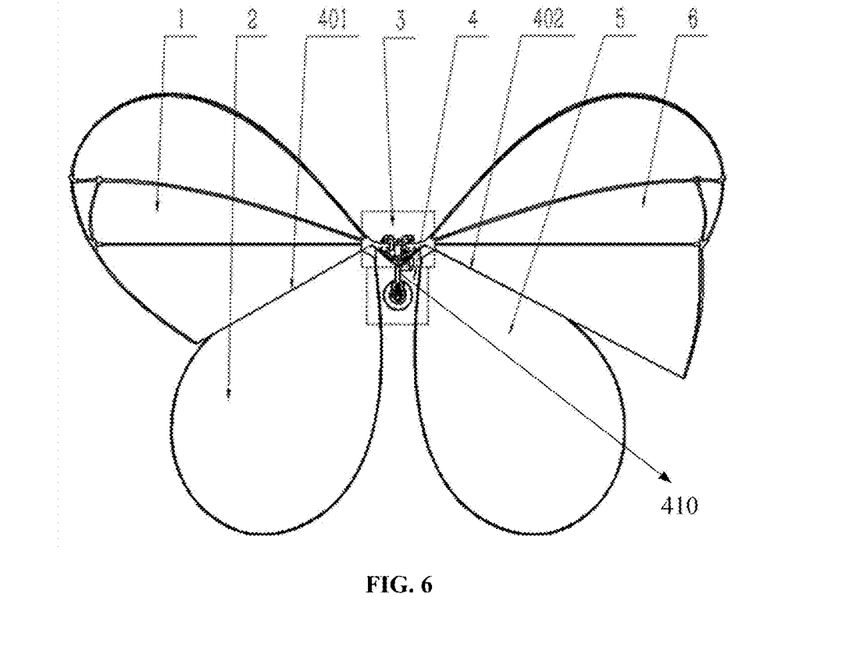
FIG. 6 is a schematic diagram of the butterfly-inspired flapping-wing aerial robot in a leftward turning state in an embodiment of the present invention.

For example, as shown in FIGS. 5 and 6, in the butterfly-inspired flapping-wing aerial robot according to the present invention, reference numerals 1, 2, 5 and 6 denote a left front wing, a left rear wing, a right rear wing, and a right front wing of the butterfly-inspired flapping-wing aerial robot, respectively, reference numeral 3 denotes a driving mechanism of the butterfly-inspired flapping-wing aerial robot, and reference numerals 401 and 402 denote a left pull cord and a right pull cord in the present invention.

FIG. 5 is a schematic diagram of the butterfly-inspired flapping-wing aerial robot flying in a straight line. The left and right wings flap in the same frequency and amplitude under the drive of its driving mechanism. At this point, both a rotary shaft of a potentiometer and a cord reel are at a median position, that is, the rotation angle is 0°. Under this state, the winding lengths of the pull cord 401 and the pull cord 402 on the cord reel are equal, and the left and right wings keep the same flexible state with the same effective area.

FIG. 6 is a schematic diagram of the butterfly-inspired flapping-wing aerial robot in a leftward turning state. During the turning, a rotation range of the rotary shaft of the potentiometer is −150° to 150°, a corresponding voltage value range, i.e. a potential value range, is 0 V to 3.3 V, and according to a meshing relationship between a potentiometer gear and a cord reel gear, a rotation range of the cord reel is −300° to 300°. During the turning, the remote controller is used to send a turning instruction to a control module 410, and the control module 410 parses the turning instruction and generates a PWM signal to control the rotation of a motor; the rotation of the motor drives the cord reel to rotate, so that the winding lengths of the pull cords in cord grooves and the lengths of the pull cords from pull cord holes to the tips of the wings change, and pull cords pull the tips of the wings to change the folding state of the wings, thus changing the wing areas to cause a difference between the left and right wings; since the left and right wings of the butterfly-inspired flapping-wing aerial robot flap in the same frequency and amplitude, when the areas of the left and right wings are different, their generated lifts are different, and as a result the fuselage and the wings are inclined leftward or rightward to carry out the turning.

Taking leftward turning as an example, the remote controller sends a leftward turning signal, the control module 410 drives the motor 409 to rotate counterclockwise, and the rotary shaft of the motor 409 drives the cord reel 408 to rotate counterclockwise, so that the winding length of the pull cord 401 in the cord groove is increased and the length of the pull cord from the pull cord hole to the tip of the left front wing is decreased to pull the left front wing to fold, reducing the area; at the same time, the winding length of the pull cord 402 in the cord groove is decreased, the length of the pull cord from the pull cord hole to the tip of the right front wing is increased, and the right front wing is unfolded under the elastic action of the carbon rod, increasing the area. Since the left and right wings of the butterfly-inspired flapping-wing aerial robot flap in the same frequency and amplitude, when the area of the right wing is larger than that of the left wing, the lift generated by the right wing is greater than that generated by the left wing, and the butterfly-inspired flapping-wing aerial robot is inclined to the left to turn leftward. During the turning, the rotation of the cord reel drives the cord reel gear to rotate synchronously, the cord reel gear meshed with the potentiometer gear drives the potentiometer gear to rotate, and the potentiometer gear drives the rotary shaft of the potentiometer to rotate synchronously, changing a potential value of the potentiometer.

In the control module 410, a rotation angle of the cord reel relative to the median position is calculated by the potential value of the potentiometer, realizing the accurate control of the rotation angle of the cord reel, so that the rotation angle of the cord reel is directly proportional to the sway angle of a directional joystick of the remote controller, that is, the larger the sway angle of the joystick of the remote controller, the larger the rotation angle of the cord reel, the greater the deformations of the wings driven by the pull cords, the more agile the turning of the butterfly-inspired flapping-wing aerial robot, and the smaller the turning radius.

What is described above is merely the preferred embodiment of the present invention, and is not used to limit the present invention, and any modifications, equivalent replacement, improvements and the like which are made within the spirit and principle of the present invention shall fall within the protection scope of the present invention.

What is claimed is:

1. A pull cord type turning mechanism for a butterfly-inspired flapping-wing aerial robot, mounted on a main carbon rod of a fuselage of the butterfly-inspired flapping-wing aerial robot, and comprising a motor, a cord reel, a cord reel gear, a potentiometer gear, a potentiometer, a control module, and a power supply, wherein the control module is connected to the motor and the potentiometer; a rotary shaft of the motor is connected to the cord reel, the cord reel is coaxially connected to the cord reel gear, the cord reel gear is meshed with the potentiometer gear, and the potentiometer gear is connected to a rotary shaft of the potentiometer; the cord reel gear is provided with two cord grooves and two pull cords, a first end of a first pull cord of the two pull cords is fixed in a first cord groove of the two cord grooves and a second end of the first pull cord is fixed at a tip of a first front wing on a left side of the butterfly-inspired flapping-wing aerial robot, a first end of a second pull cord of the two pull cords is fixed in a second cord groove of the two cord grooves, and a second end of the second pull cord is fixed at a tip of a second front wing on a right side of the butterfly-inspired flapping-wing aerial robot, and the two pull cords are wound in opposite directions in the two cord grooves; a rotation of the cord reel pulls the two pull cords, the first pull cord of the two pull cords pulls the first front wings on the left side to deform and the second pull cord of the two pull cords pulls the second front wing on the right side to deform, leading to a difference between effective areas of the first front wing on the left side and the second front wing on the right side to perform turning; and the control module is configured for: receiving a turning instruction sent by a remote controller of the butterfly-inspired flapping-wing aerial robot, determining a rotation direction and a target angle of the cord reel according to the turning instruction, controlling the motor to start rotating according to the rotation direction; and acquiring a potential value of the potentiometer in real time from the potentiometer, determining a rotation angle of the cord reel according to the potential value and controlling the motor to stop when the rotation angle of the cord reel reaches the target angle.

2. The pull cord type turning mechanism of claim 1, further comprising a support frame, wherein the support frame is provided with a support frame fixing hole, a motor fixing hole, and a potentiometer fixing hole; the motor fixing hole is configured for fixing the motor on the support frame; the potentiometer fixing hole is configured for fixing the potentiometer on the support frame; and the support frame fixing hole is configured for fixing the support frame on the main carbon rod of the fuselage.

3. The pull cord type turning mechanism of claim 2, wherein the support frame is also provided with a cord reel gear fixing hole, the cord reel gear fixing hole is connected to a first end of a fixed shaft, and a second end of the fixed shaft is inserted into a central hole of the cord reel gear.

4. The pull cord type turning mechanism of claim 3, wherein the support frame is also provided with two pull cord holes for threading the two pull cords; and the first pull cord wound in the first cord groove passes through a first pull cord hole of the two pull cord holes in the support frame and is connected to the tip of the first front wing on the left side, while the second pull cord wound in the second cord groove passes through a second pull cord hole of the two pull cord holes in the support frame and is connected to the tip of the second front wing on the right side.

5. The pull cord type turning mechanism of claim 1, wherein each of the two cord grooves is provided with a pull cord fixing hole, and the pull cord fixing hole is configured for fixing one end of a corresponding pull cord of the two pull cords.

6. The pull cord type turning mechanism of claim 1, wherein the cord reel gear and the potentiometer gear are gears with a same modulus, and a quantity of teeth of the cord reel gear is half of that of the potentiometer gear.

7. The pull cord type turning mechanism of claim 6, wherein an effective rotation angle of the rotary shaft of the potentiometer is 0° to 300°, a corresponding rotation angle of the cord reel is 0° to 600°, and each pull cord is wound in a corresponding cord groove of the two cord groves for two turns.

8. The pull cord type turning mechanism of claim 1, further comprising a power supply, wherein the power supply is connected to the control module, the motor, and the potentiometer; and the control module and the power supply are fixed on the main carbon rod of the fuselage.

9. The pull cord type turning mechanism of claim 1, wherein the motor is a coreless motor.

10. A butterfly-inspired flapping-wing aerial robot, comprising: a fuselage, a driving mechanism mounted on a main carbon rod of the fuselage, and a turning mechanism mounted on the main carbon rod of the fuselage, wherein the turning mechanism is the pull cord type turning mechanism of claim 1; the fuselage comprises the main carbon rod, the first front wings mounted on a left side of the main carbon rod, and the second front wing mounted on a right side of the main carbon rod, a rear wing mounted on the left side of the main carbon rod, and a rear wing mounted on the right side of the main carbon rod; the driving mechanism is configured for driving the wings on the left and right sides to flap in a same frequency and a same amplitude; and the pull cord type turning mechanism is configured for changing an effective area of a wing on one of the left side or the right side to perform turning under the control of the remote controller.

11. The butterfly-inspired flapping-wing aerial robot of claim 10, wherein the pull cord type turning mechanism further comprises a support frame, the support frame is provided with a support frame fixing hole, a motor fixing hole, and a potentiometer fixing hole; the motor fixing hole is configured for fixing the motor on the support frame; the potentiometer fixing hole is configured for fixing the potentiometer on the support frame; and the support frame fixing hole is configured for fixing the support frame on the main carbon rod of the fuselage.

12. The butterfly-inspired flapping-wing aerial robot of claim 10, wherein the support frame is also provided with a cord reel gear fixing hole, the cord reel gear fixing hole is connected to a first end of a fixed shaft, and a second end of the fixed shaft is inserted into a central hole of the cord reel gear.

13. The butterfly-inspired flapping-wing aerial robot of claim 10, wherein the support frame is also provided with two pull cord holes for threading the two pull cords; and the first pull cord wound in the first cord groove passes through a first pull cord hole of the two pull cord holes in the support frame and is connected to the tip of the first front wing on the left side, while the second pull cord wound in the second cord groove passes through a second pull cord hole of the two pull cord holes in the support frame and is connected to the tip of the second front wing on the right side.

14. The butterfly-inspired flapping-wing aerial robot of claim 10, wherein each of the two cord grooves is provided with a pull cord fixing hole, and the pull cord fixing hole is configured for fixing one end of a corresponding pull cord of the two pull cords.

15. The butterfly-inspired flapping-wing aerial robot of claim 10, wherein the cord reel gear and the potentiometer gear are with a same modulus, and a quantity of teeth of the cord reel gear is half of that of the potentiometer gear.

16. The butterfly-inspired flapping-wing aerial robot of claim 10, wherein an effective rotation angle of the rotary shaft of the potentiometer is 0° to 300°, a corresponding rotation angle of the cord reel is 0° to 600°, and each pull cord is wound in a corresponding cord groove of the two cord grooves for turns.

17. The butterfly-inspired flapping-wing aerial robot of claim 10, wherein the pull cord type turning mechanism further comprises the power supply, the power supply is connected to the control module, the motor, and the potentiometer; and the control module and the power supply are fixed on the main carbon rod of the fuselage.

18. The butterfly-inspired flapping-wing aerial robot of claim 10, wherein the motor is a coreless motor.

* * * * *